(12) United States Patent
Nishida

(10) Patent No.: US 7,525,694 B2
(45) Date of Patent: Apr. 28, 2009

(54) IMAGE PROCESSING DEVICE, IMAGE PROCESSING METHOD, IMAGE PROCESSING PROGRAM, AND RECORDING MEDIUM

(75) Inventor: Hirobumi Nishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 318 days.

(21) Appl. No.: 11/191,954

(22) Filed: Jul. 29, 2005

(65) Prior Publication Data
US 2006/0033963 A1 Feb. 16, 2006

(30) Foreign Application Priority Data
Aug. 10, 2004 (JP) ............... 2004-233802

(51) Int. Cl.
*H04N 1/40* (2006.01)
(52) U.S. Cl. ..................... 358/462; 382/254
(58) Field of Classification Search .......... 382/254; 358/462
See application file for complete search history.

(56) References Cited

U.S. PATENT DOCUMENTS

| | | | |
|---|---|---|---|
| 5,742,703 A * | 4/1998 | Lin et al. ............... | 382/176 |
| 6,025,826 A | 2/2000 | Hung et al. | |
| 6,301,385 B1 | 10/2001 | Chen et al. | |
| 6,347,156 B1 | 2/2002 | Kamada et al. | |
| 7,010,177 B1 | 3/2006 | Mattison | |
| 2004/0076337 A1* | 4/2004 | Nishida ................ | 382/274 |

FOREIGN PATENT DOCUMENTS

| | | |
|---|---|---|
| CN | 1324469 | 11/2001 |
| EP | 0718793 A2 | 2/1996 |
| JP | 8-340446 | 12/1996 |
| JP | 2001-118032 | 4/2001 |
| JP | 3345350 | 8/2002 |
| JP | 2003-281526 | 10/2003 |

OTHER PUBLICATIONS

Michael Klupsch, "Object-Oriented Image Processing in Smalltalk: Using Complex Operator Objects" Proceedings of International Conference on Information Systems Analysis and Synthesis, Apr. 1996, pp. 1-11, XP-002366371, Orlando, USA.
William I. Grosky and Peter L. Stanchev, "Object-Oriented Image Database Model", Proceedings of the ISCA 16th International Conference Computers and Their Applications, Feb. 28, 2001, pp. 94-97, ISCA, XP002366370, Seattle, USA.

(Continued)

*Primary Examiner*—Samir A. Ahmed
*Assistant Examiner*—Stephen R Koziol
(74) *Attorney, Agent, or Firm*—Dickstein Shapiro LLP

(57) ABSTRACT

An image processing system is provided that performs object-oriented image processing and collectively manages image data, image elements, and the history and state of the image processing. In this image processing system, an original image object to be normalized is generated for image data to be processed. Next, the normalized image data is converted into the optimum image data format in compliance with the purpose of use, using an optimizing object. The generation of the object and the condition setting and changes are performed by the same methods (functions) in the object.

8 Claims, 17 Drawing Sheets

OTHER PUBLICATIONS

Shin et al., "Enhancement of Mail Piece Images Based on Window Statistics" SPIE, vol. 1906, pp. 37-48 (1993).

Koskinen et al., "Text Enhancement Method Based on Soft Morphological Filters" SPIE, vol. 2181, pp. 243-253 (1994).

Liang et al., "Document Image Restoration Using Binary Morphological Filters" SPIE, vol. 2660, pp. 274-285 (1996).

Ramponi et al., "Enhancing Document Images with a Quadratic Filter" Signal Processing, vol. 33, pp. 23-34 (1993).

Jaisimha et al., "Model Based Restoration of Document Images for OCR" SPIE, vol. 2660, pp. 297-308 (1996).

Hobby et al., "Enhancing Degraded Document Images Via Bitmap Clustering and Averaging" Proceeding of 4th International Conference on Document Analysis and Recognition, Aug. 1997, 7 pages.

Thouin et al., "A Method for Restoration of Low-Resolution Document Images" International Journal of Document Analysis and Recognition, vol. 2, pp. 200-210 (2000).

Thouin et al., "Automated System for Restoration of Low-Resolution Document and Text Images" Journal of Electronic Imaging, vol. 10(2), pp. 535-547, Apr. 2001.

Taylor et al., "Enhancement of Document Images from Cameras" SPIE, vol. 3305, pp. 230-241 (1998).

Li et al., "Text Enhancement in Digital Video" Proceedings of SPIE, vol. 3651, pp. 2-9 (1999).

Breuel et al., "Paper to PDA" Proceeding of 16th International Conference on Pattern Recognition, 4 pages, Aug. 2002.

Chen You-Xin, et al., Character Extraction in Complex Color Document Images, Journal of Chinese Information Processing, Oct. 31, 2003, pp. 55-59, vol. 17 No. 5, Image Processing div., Dept. of Electronic Engineering, Tsinghua University, Beijing, China.

* cited by examiner

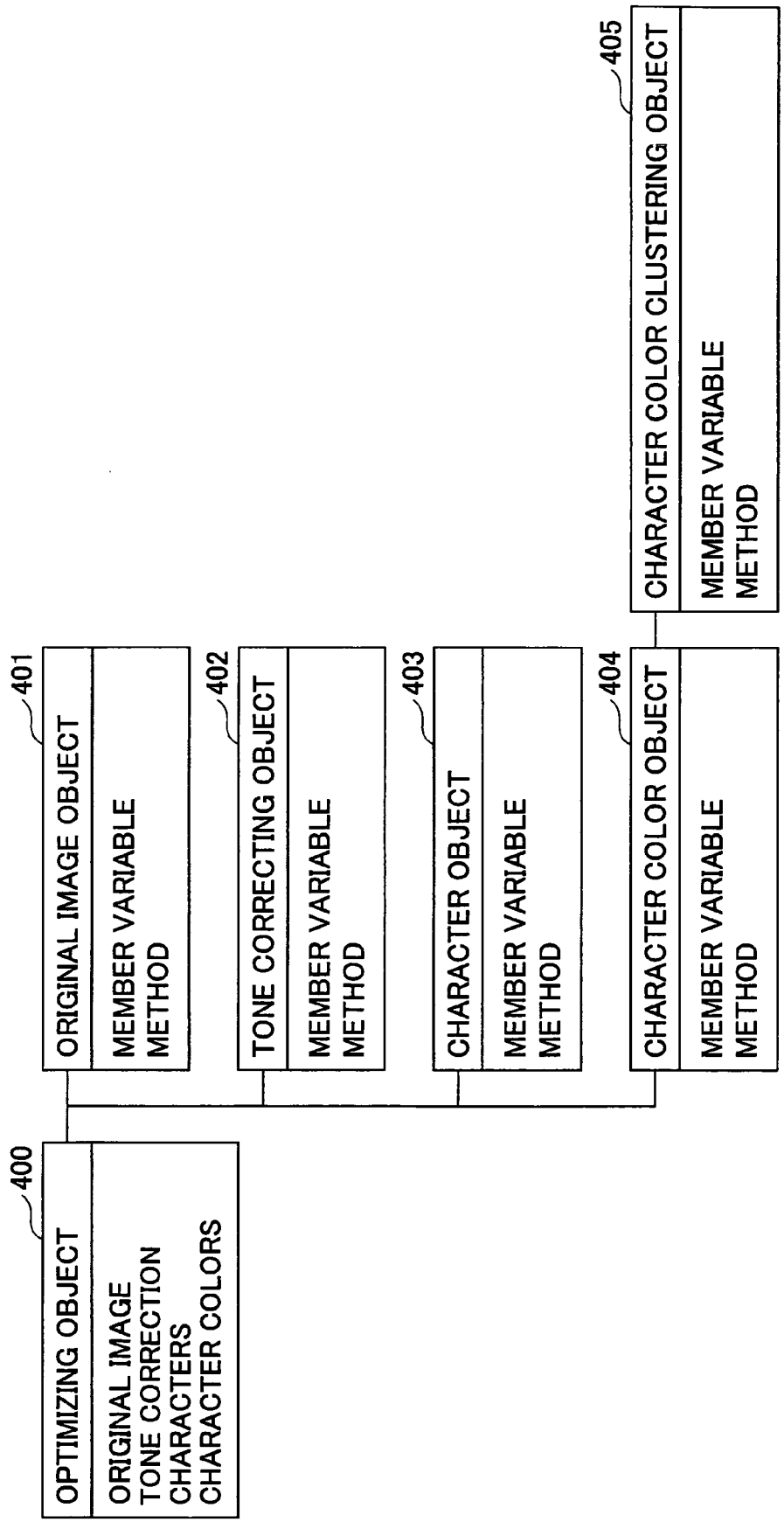

FIG.5

```
class OriginalImage { // original image class derived from base class image
    // optimizing object generation and condition setting/changing procedures
    void set_tone_correction(int mode, int factor);         // tone correction
    void set_text_enhancement(int factor); };               // character and character color
    // pointer to optimizing object
    class ToneCorrection tone;          // tone correction
    class TextColor text_color;         // character color
    class BinaryText binary_text[MAXMAGNIFY]; }; // character (each resolution magnification, 1~MAXMAGNIFY times)
    // current state
    int tone_correction_mode;           // tone correcting mode (background elimination/background cleaning/correction OFF)
    int tone_correction_factor;         // index for correction used in case of background elimination/background cleaning
    int magnification_factor; // character resolution magnification (0 in case of no character emphasis)
    // image rendering procedure in accordance with current state
    char *rendering();          // raster image generation
    char *get_character(int x0, int y0, int w, int h);                  // color character image generation in designated region
    char *get_binary_character(int x0, int y0, int w, int h); // binary character image generation in designated region
    char *get_color_plane(int id);      // generation of character image belonging to color cluster id
};

class Image : Root {
    // basic data and settings
    unsigned char *array;       // image data array
    int width, height, resolution;      // image width, height, resolution
    void set_image(char *dibarray);     // procedures for setting image data, width, height, resolution
};
```

```
                                                              600
class Text Color : Image {    // text color class derived from base class
     // optimizing object generation and condition setting/changing procedures
     void set_color_clustering(int flg);      // character color cluster
     // pointer to optimizing object
     class ColorCluster cluster;  // character color cluster
     // current state
     int clustering;     // clustering ON/OFF
     int number_of_cluster();   // number of color clusters
};
class Image : Root {
     // basic data and settings
     unsigned char *array;      // image data array
     int width, height, resolution;         // image width, height, resolution
};
```

FIG.7A
```
class OriginalImage img;   // declaration of original image object
char *dibarray;            // pointer to rendered image
img.set_image(dibarray_0); // setting of original image object ("dibarray_0" being pointer to input image)
dibarray = img.rendering(); // image rendering
```
710
FIG.7B
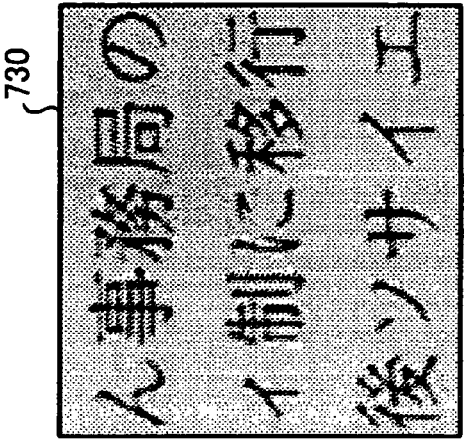
720
FIG.7C
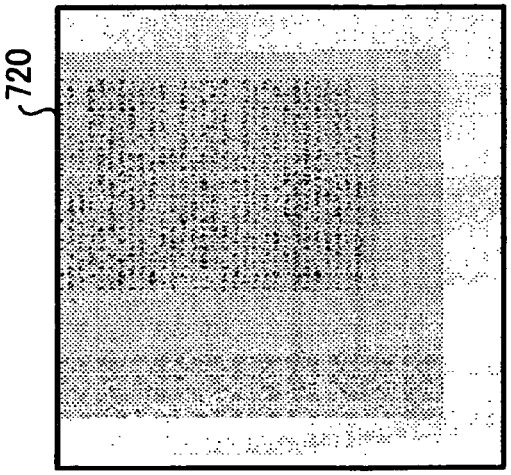
730

FIG.8A
```
img.set_tone_correction(1, 0);   // background cleaning (level 0) setting
img.set_text_enhancement(2);     // character resolution increasing (doubling) setting
dibarray = img.rendering();      // image rendering
```
810
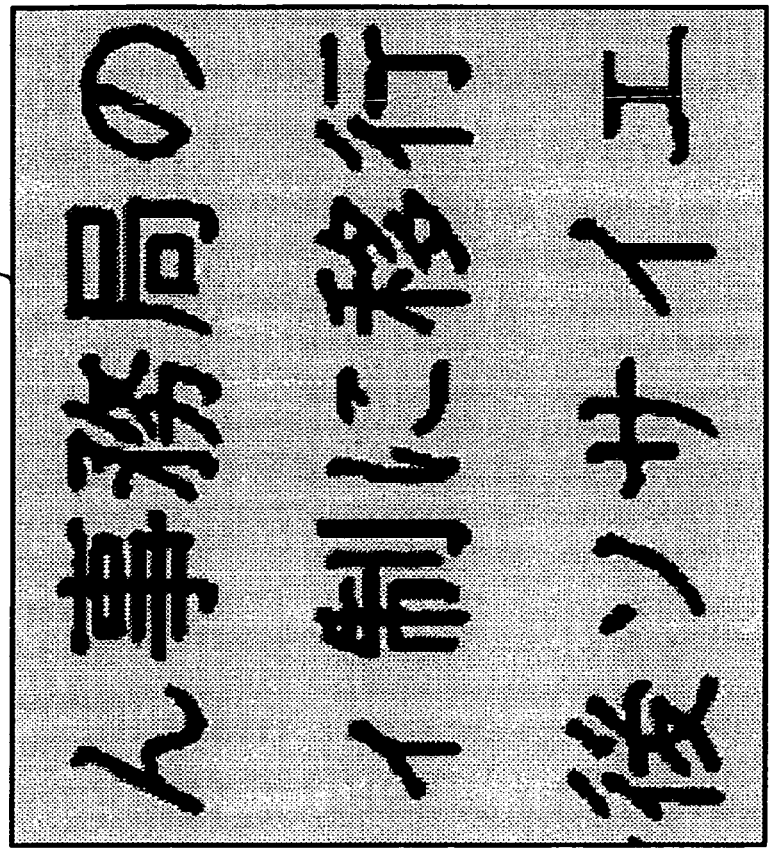
FIG.8C
830
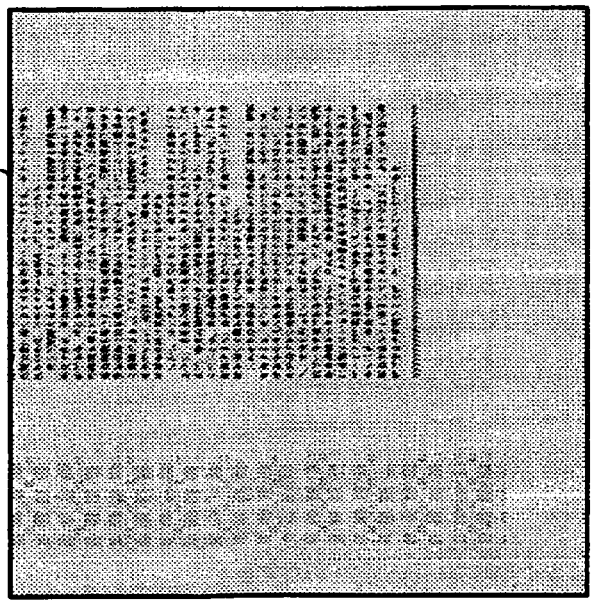
FIG.8B
820

FIG.9A
```
img.set_tone_correction(0, -1); // "undo" setting for background cleaning setting
dibarray = img.rendering(); // image rendering
```
FIG.9B
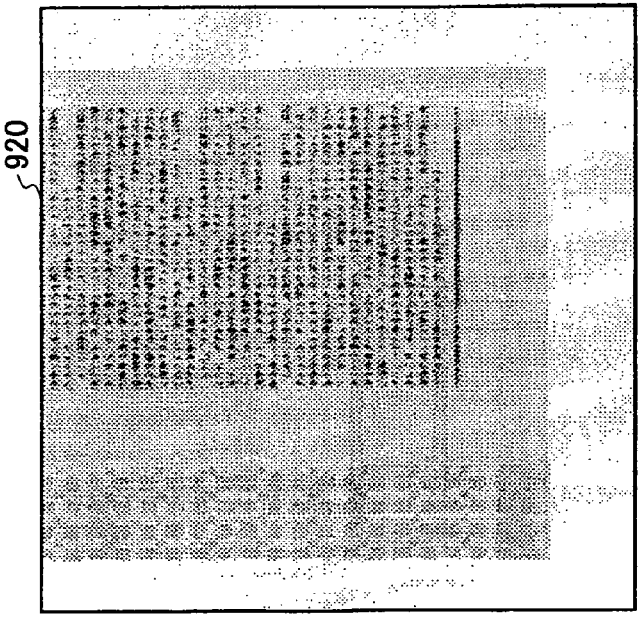
FIG.9C
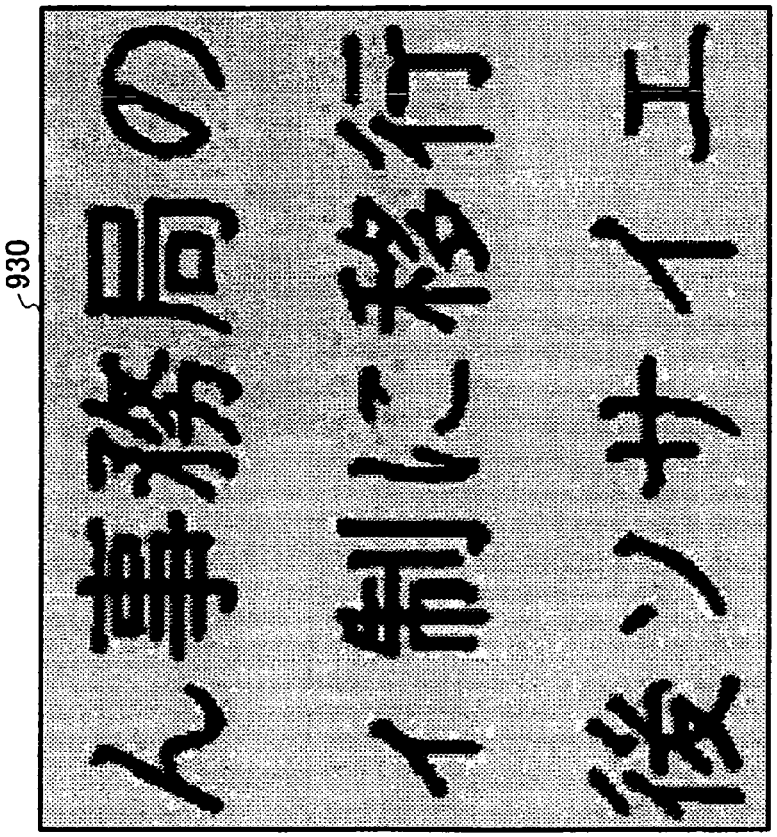

FIG.10A
```
img.set_text_enhancement(0); // "undo" setting for character emphasis
img.set_tone_correction(0, 0); // background elimination (level 0) setting
dibarray = img.rendering(); // image rendering
```
1010
FIG.10B
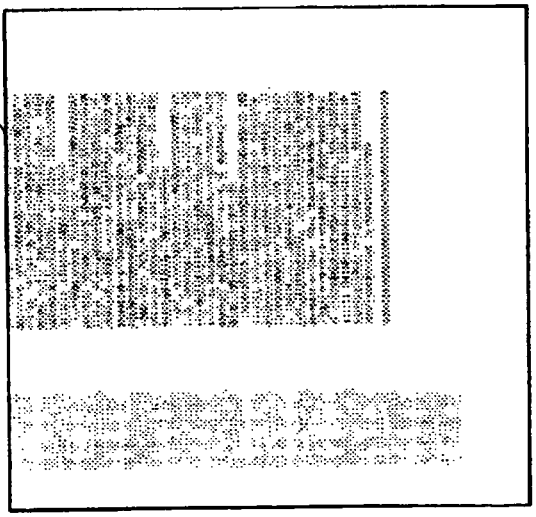
1020
FIG.10C
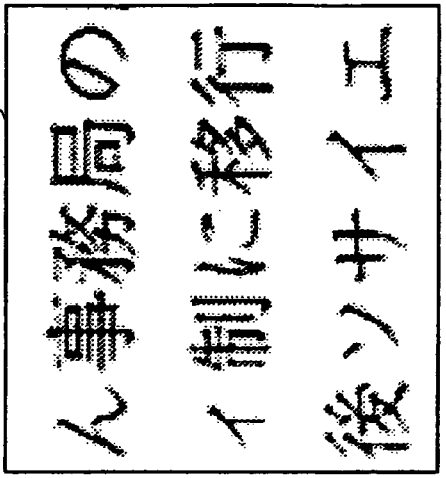
1030

FIG.11A
```
img.set_text_enhancement(2); // character resolution increasing (doubling) setting
img.text_color.set_color_clustering(1); // character color clustering setting
// retrieve color planes
for (i = 0; i < img.text_color.number_of_cluster(); i++) {
    dibarray = img.get_color_plane(i);
}
```
1110
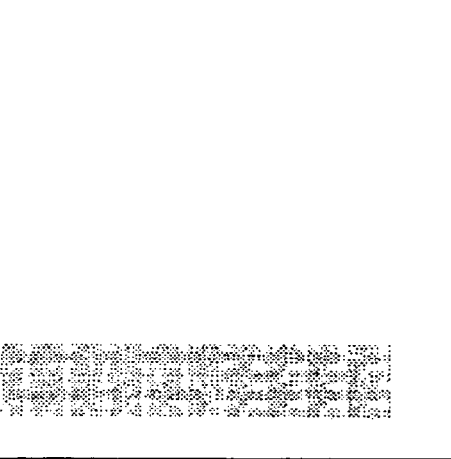
FIG.11B
1120
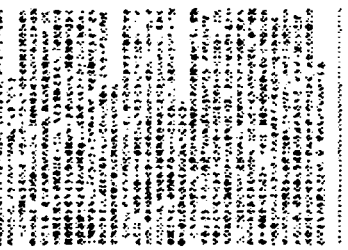
FIG.11C
1130

```
dibarray = img.rendering();  //  image rendering
```
1210

1220 dibarray = img.get_binary_character(807, 828, 25, 25); // binary image extraction from partial region 1310

1320

```
img.set_text_enhancement(1); // character extraction (original resolution) setting
dibarray = img.get_binary_character(807, 828, 25, 25);
```

1330

1340

FIG.14A
```
img.set_tone_correction(0, -1); // "undo" setting for background cleaning setting
img.set_text_enhancement(0); // "undo" setting for character emphasis
dibarray = img.rendering(); // image rendering
```
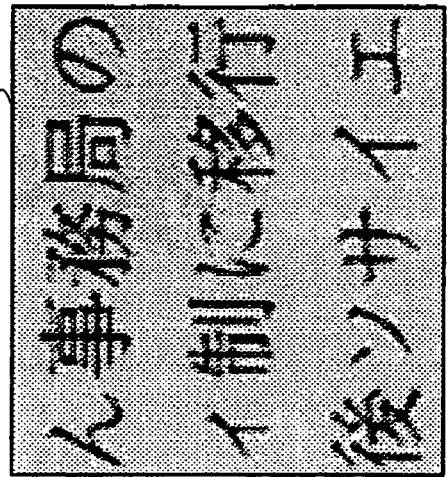
FIG.14C
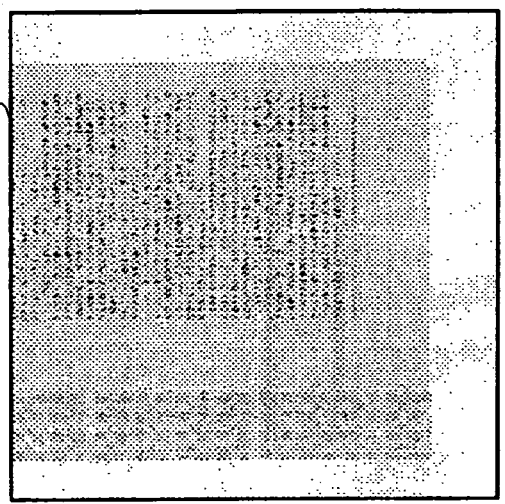
FIG.14B dibarray = img.get_binary_character(807, 828, 25, 25); // binary image extraction from partial region
// "dibarray" being 0

```
img.set_text_enhancement(2); //character resolution increasing (doubling) setting
dibarray = img.get_binary_character(807, 828, 25, 25);
```
1610

1620

IMAGE PROCESSING DEVICE, IMAGE PROCESSING METHOD, IMAGE PROCESSING PROGRAM, AND RECORDING MEDIUM

BACKGROUND OF THE INVENTION

1. Field of the Invention

The present invention relates to a method of processing and recognizing a digital document image to improve the image quality for outputting the image to a printer or displaying the image on a display device. The digital image of a printed document is input through an imaging device such as a scanner. The present invention also relates to a program for causing a computer to execute a document imaging operation to perform image processing, and to execute the method for the document image processing and recognition. The present invention further provides a device for performing the document image processing by the method, and a computer-readable recording medium on which the program is recorded.

2. Description of the Related Art

As color scanners and digital cameras have widely spread, printed color documents are often used as input information that is accumulated, output, and reused. Further, input image data is transmitted to remote places over a network. When digital color document image data is displayed or printed as it is without image processing, or is processed by an OCR (Optical Character Reader) or the like that optically reads in and recognizes the characters in the displayed image, the following phenomena are often observed.

The contrast between the characters and the background is weak.

The background, which should be white in the first place, is colored.

The background is smudged due to see-through images or noise.

Mutual interference among pixels causes a moire phenomenon that results in an evenly striped pattern.

Due to a low resolution, the visibility of small prints is low, and the recognition accuracy is low even after processing is performed with an OCR.

So as to eliminate those problems, it is necessary to perform an image enhancing operation that is suitable for color document image data. Text image enhancing methods that have been disclosed as solutions can be classified into the following four types: tone correction such as contrast enhancement, filtering, model-based image restoration, and increasing resolution.

Tone correction can be performed to eliminate colors from the background, as well as to emphasize the contrast in image data (see Patent Document 1, and Non-Patent Document 1 and 2, for example). As for the filtering, noise eliminating methods utilizing morphology for extracting the features from binary image data or grayscale image data has been disclosed (see Non-Patent Documents 3 and 4, for example). As another example of the filtering method, a method of eliminating noise using a secondary filter without blurring the details has been disclosed (see Non-Patent Document 5, for example).

The cause of a moire phenomenon is the halftone color portion that is represented as a dot pattern in image data. However, a moire phenomenon can be avoided by converting the halftone color portion into continuous tone representation (see Patent Document 2, for example). It is also effective to employ the model-based image restoration, such as a method of restoring an image by carrying out cluster analysis on the causes of OCR recognition errors and classifying the causes into models (see Non-Patent Document 6, for example).

To increase the character visibility and the accuracy of an OCR, it is effective to increase the resolution of low-resolution character image data. To achieve this, the following methods have been disclosed: a method of generating the outline for a desired resolution by averaging the character bitmap (data that represents each image as arrays of colored dots) through clustering (see Patent Document 3 and Non-Patent Document 7, for example); a method of restoring optimum high-resolution image data by formulating it as an inverse problem based on the evaluation function formed with the three criteria of distribution diphasic, smoothness, and brightness (see Non-Patent Documents 8 and 9, for example); and a method of increasing a resolution and binarizing data through interpolation (see Patent Documents 4 through 7, and Non-Patent Documents 10 and 11, for example). By performing various operations on color document image data as above, optimum image data for various purposes of use, such as display, printing, and OCR, can be generated.

Recently, other than the generation of binary image data suitable for OCRs and raster image data suitable for printing, new purposes of use have emerged for digitized images. For example, the following techniques have been disclosed: a novel image data file representing technique of representing image data based on "Mixed Raster Content Model" that divides the image data into the background (reduced to a low resolution), the foreground such as characters (of the original resolution or a higher resolution), and the colors of the foreground (such as a character color palette); and a technique of rearranging and reconstructing the constituent elements of characters and pictures obtained from scanned image data, so as to turn them into a format suitable for browsing on a screen using HTML (see Non-Patent Document 12, for example).

The following is a list of the above mentioned reference documents:

Patent Document 1: U.S. Pat. No. 5,524,070

Patent Document 2: Japanese Laid-Open Patent Application No. 2003-281526

Patent Document 3: U.S. Pat. No. 5,930,393

Patent Document 4: Japanese Patent No. 3345350

Patent Document 5: Japanese Laid-Open Patent Application No. 8-340446

Patent Document 6: Japanese Laid-Open Patent Application No. 2001-118032

U.S. Pat. No. 6,347,156

Non-Patent Document 1: Y. C. Shin, et al., "Contrast Enhancement of Mail Piece Images", (USA), Proceedings of SPIE, 1992, vol. 1661, pp. 27-37

Non-Patent Document 2: Y. C. Shin, et al., "Enhancement of Mail Piece Images Based on Window Statistics", (USA), Proceedings of SPIE, 1993, vol. 1906, pp. 37-48

Non-Patent Document 3: L. Koskinen, et al., "Text Enhancement Method Based on Soft Morphological Filters", (USA), Proceedings of SPIE, 1994, vol. 2181, pp. 243-253

Non-Patent Document 4: J. Liang, et al., "Document Image Restoration Using Binary Morphological Filters", (USA), Proceedings of SPIE, 1996, vol. 2660, pp. 274-285

Non-Patent Document 5: G. Ramponi, et al., "Enhancing Document Images with a Quadratic Filter", (USA), Signal Processing, 1993, vol. 33, pp. 23-34

Non-Patent Document 6: M. Y. Jaisimha, et al., "Model-Based Restoration of Document Images for OCR", (USA), Proceedings of SPIE, 1996, vol. 2660, pp. 297-308

Non-Patent Document 7: J. D. Hobby, et al., "Enhancing Degraded Document Images via Bitmap Clustering and Averaging", (Germany), Proceeding of 4th International Conference on Document Analysis and Recognition, August 1997

Non-Patent Document 8: P. D. Thouin, et al., "A Method for Restoration of Low-Resolution Document Images", (USA), International Journal on Document Analysis and Recognition, 2000, vol. 2, pp. 200-210

Non-Patent Document 9: P. D. Thouin, et al., "Automated System for Restoration of Low-Resolution Document and Text Images", (USA), Journal of Electronic Imaging, 2001, vol. 10, No. 2, pp. 535-547

Non-Patent Document 10: M. J. Taylor, et al., "Enhancement of Document Images from Cameras", (USA), Proceedings of SPIE, 1998, vol. 3305, pp. 230-241

Non-Patent Document 11: H. Li, et al., "Text Enhancement in Digital Video", (USA), Proceedings of SPIE, 1999, vol. 3651, pp. 2-9

Non-Patent Document 12: T. Breuel, et al., "Paper to PDA", (Canada), Proceeding of 16th International Conference on Pattern Recognition, August 2002

In a case where the number of data formats (purposes of use) designated by users for color document image data is small, several operations are performed on input image data in a pipeline fashion, so as to obtain resultant image data. However, as the purposes of use have become more varied, the following problems have arisen:

1) A load and waste are caused in the application program for each purpose of use.

Since the same procedure is called up for each purpose of use, unnecessary operations need to be performed.

The intermediate data that is necessary for "Undo" and "Redo" of procedures needs to be managed separately for each purpose of use.

The history and conditions of operations need to be managed separately for each purpose of use.

2) Enhancement and system maintenance become difficult.

When a new operation for generating optimum image data for a certain purpose of use is employed, or a new purpose of use, a new file format, or a new image data representing format is introduced, it is necessary to cope with the new operation or format in the individual application program for each purpose of use.

The file format or image representing format associated with each purpose of use might be mistaken for the procedure for generating an optimum image. To counter this problem, application programs with low modularity need to be produced in the same number as the number of file formats or image representing formats.

SUMMARY OF THE INVENTION

A general object of the present invention is to provide an image processing device, an image processing method, an image processing program, and a recording medium in which the above disadvantages are eliminated.

A more specific object of the present invention is to provide an image processing device that manages and processes data for generating the optimum image for each purpose of use of color document image data input through a scanner or an imaging device by a technique that causes a smaller load and less waste. Such an image processing device also has excellent extensibility, and maintenance for such a device is easily performed.

The above objects of the present invention are achieved by an image processing device that performs object-oriented image processing, using an image processing object that includes an original image object that is generated by normalizing image data containing an image feature quantity, image elements, and functions for image processing, the image data being in a state suitable for the image processing, and an optimizing object for generating image data in a format designated by a user. This image processing device includes: an image data acquiring unit that acquires image data to be subjected to the image processing; a normalizing unit that normalizes the image data acquired by the image data acquiring unit, so as to generate the original image object; and an optimizing unit that generates optimum image data with the optimizing object, based on the image data normalized by the normalizing unit.

With this image processing device, the optimum image data suitable for various purposes of use requested by users can be generated for any input data supplied from any type of image data input device.

The above objects of the present invention are also achieved by an image processing method for performing object-oriented image processing, using an image processing object that includes an original image object that is generated by normalizing image data containing an image feature quantity, image elements, and functions for image processing, the image data being in a state suitable for the image processing, and an optimizing object for generating image data in a format designated by a user. This method includes the steps of: acquiring image data to be subjected to the image processing; normalizing the image data acquired in the image data acquiring step, so as to generate the original image object; and generating optimum image data with the optimizing object, based on the image data normalized in the normalizing step.

By this method, the optimum image data for various purposes of use requested by users can be generated for any type of color document image data.

In the above image processing method, the optimum image data generating step includes the steps of: collectively changing the background portion of the normalized image data into white; and generating the optimizing object as an object that represents the tone correction curve to be used in the background eliminating step.

By this method, the background portion of the image data can be reduced to white, using the tone correction curve. Further, an object is generated to store and hold the parameter for the color elimination.

In the above image processing method, the optimum image data generating step includes the steps of: collectively changing the background portion of the normalized image data into a representative color; and generating the optimizing object as an object that represents the tone correction curve to be used in the background cleaning step.

By this method, the background portion of the image data can be reduced to a representative color, using the tone correction curve. Further, an object is generated to store and hold the parameter for the color reduction.

In the above image processing method, the optimum image data generating step includes the steps of: extracting characters from the normalized image data, the characters being extracted as binary image data of the original resolution or a higher resolution; and generating the optimizing object as an object that represents the binary image data extracted in the extracting step.

By this method, the characters in the image data can be extracted, and can be stored and held as binary image data of the original resolution or a higher resolution.

In the above image processing method, the optimum image data generating step includes the steps of: estimating a color for each character extracted from the normalized image data; and generating the optimizing object as an object that represents the character color data estimated in the estimating step.

By this method, the characters contained in the image data can be extracted, and the color data of each character can be stored and held.

In the above image processing method, the optimizing object generating step includes the steps of: classifying the character color data into a small number of clusters, and allocating each character in the normalized image data to one of the color clusters; and generating an object that represents cluster characterizing data and the cluster allocating data as to each character, the object being generated as one of objects that form the optimizing object.

By this method, the stored character color data can be classified into a small number of clusters, and each character contained in image data can be allocated to one of the color clusters.

In the above image processing method, the original image object generated in the normalizing step and the optimizing object generated in the optimizing object generating step both have basic data that includes the image feature quantity and the image elements. In this method, the normalizing step and the optimizing object generating step both include the steps of: calculating an image feature quantity and image elements for defining the image processing to be performed on the basic data; generating an object for storing and holding the calculation result of the calculating step; managing the setting, updating, current operation state, and history of the basic data in the object, having a pointer to the object generated in the object generating step; and generating image data in accordance with the current operation state of the object, having the data of the operation state and the history.

By this method, complicated functions and condition management can be collectively performed with an object.

In the above image processing method, the image data generating step includes the step of generating raster image data of the entire portion or a designated portion.

By this method, raster image data on which operations such as tone correction and resolution correction have been performed can be generated in accordance with the state of the object.

In the above image processing method, the image data generating step includes the step of generating binary image data or color image data that are characters contained in the entire portion or a designated portion.

By this method, the character image data of a designated portion can be output by referring to the current state of the object, especially the resolution magnification of the character data.

In the above image processing method, the image data generating step includes the step of generating image data collectively containing the characters in a color that belongs to a designated color cluster of the entire portion or a designated portion.

By this method, a binary image that collectively contains the characters in the color belonging to each color cluster can be generated.

The above objects of the present invention are also achieved by an image processing program for causing a computer to execute any one of the above image processing methods.

As this program is formed with existing objects, it is possible to cope with various purposes of use and the characteristics of various image data input devices.

The above objects of the present invention are also achieved by a recording medium on which the above image processing program is recorded.

With this recording medium, the image processing in accordance with the present invention can be performed anywhere, as long as the components of the above described image processing device are prepared.

In accordance with the present invention, object-oriented data processing is performed. Accordingly, an image processing device that causes a smaller load and less waste can be provided. Such an image processing device exhibits excellent extensibility, and maintenance of such a device can be easily performed. Also, the present invention also provides an image processing method, an image processing program, and a recording medium that involves the above image processing device.

The above and other objects, features, and advantages of the present invention will become more apparent from the following detailed description taken in conjunction with the accompanying drawings.

BRIEF DESCRIPTION OF THE DRAWINGS

FIG. 4 shows an example structure of an optimizing object;

FIG. 5 shows an example of the program for defining the class of original image objects;

FIG. 6 shows an example of the program for defining the class of character color objects;

FIG. 7A shows an example of the program for an object relating to original image generation;

FIG. 7B shows a result of the image generation in accordance with the source codes shown in FIG. 7A;

FIG. 7C shows an enlarged image of a part of the image generation result shown in FIG. 7B;

FIG. 8A shows an example of the program relating to the background cleaning in an image;

FIG. 8B shows a result of image generation in accordance with the source codes shown in FIG. 8A;

FIG. 8C shows an enlarged image of a part of the image generation result shown in FIG. 8B;

FIG. 9A shows an example of the program relating to the background cleaning in an image;

FIG. 9B shows a result of image generation in accordance with the source codes shown in FIG. 9A;

FIG. 9C shows an enlarged image of a part of the image generation result shown in FIG. 9B;

FIG. 10A shows an example of the program relating to the character emphasis and background cleaning in an image;

FIG. 10B shows a result of image generation in accordance with the source codes shown in FIG. 10A;

FIG. 10C shows an enlarged image of a part of the image generation result shown in FIG. 10B;

FIG. 11A shows an example of the program relating to the character resolution and character colors in an image;

FIG. 11B shows a result of image generation in accordance with the source codes shown in FIG. 11A;

FIG. 11C shows another result of image generation in accordance with the source codes shown in FIG. 11A;

FIG. 14A shows an example of the program relating to the tone correction, characters, and character colors in an image;

FIG. 14B shows a result of image generation in accordance with the source codes shown in FIG. 14A;

FIG. 14C is an enlarged image of a part of the image generation result shown in FIG. 14B;

DESCRIPTION OF THE PREFERRED EMBODIMENTS

The following is a detailed description of preferred embodiments of image processing methods, image processing devices, image processing programs, and recording media in accordance with the present invention, with reference to the accompanying drawings.

In the present invention, a program that utilizes "object orientation" is employed. The "object orientation" is a notion that puts emphasis on the variables relating to the program and the functions to be carried out, rather than the inner structure of the program. In the embodiments of the present invention, when color document image data is to be processed, the "materials" for generating the original image data (normalized image data) and the optimum image data for each purpose of use, the conventional procedures for generating the optimum image data, and the history and conditions of operations are collectively managed as "objects".

More specifically, the "materials" for generating the optimum image data include a set of parameters for defining the tone correcting function, binary image data that represents high-resolution characters, and character color data and the corresponding cluster data. The history and materials of operations include the index of the tone correcting function that is selected from the set of available functions, the magnification to increase the resolution, the character color clustering method, and ON/OFF control on each operation.

EMBODIMENTS

Figure 1:
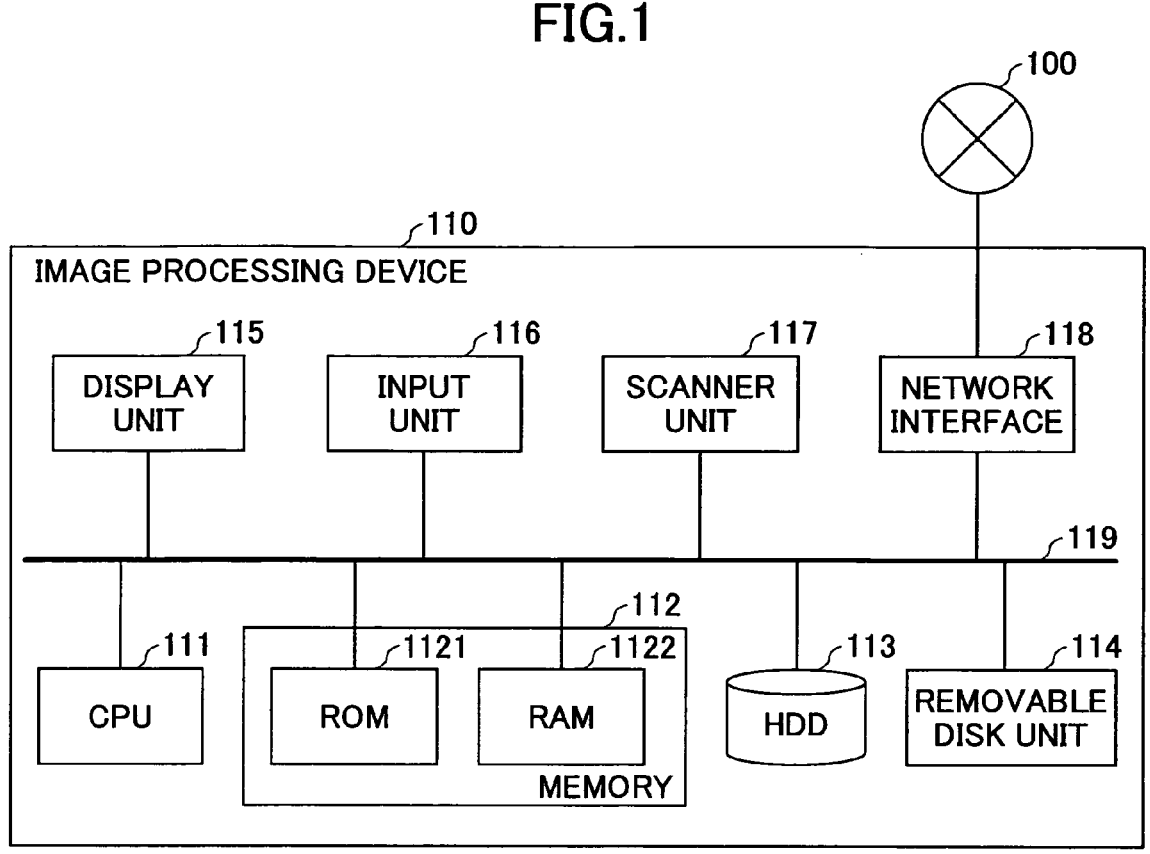
FIG. 1 is a block diagram illustrating an example structure of an image processing device.

FIG. 1 is a block diagram of an example structure of an image processing device that embodies an image processing method in accordance with the present invention. In FIG. 1, the image processing device 110 includes a CPU 111, a memory 112 (formed with a ROM 1121 and a RAM 1122), a hard disk unit (hereinafter referred to as "HDD") 113, a removable disk unit 114, a display unit 115, an input unit 116 that includes pointing devices such as a keyboard and a mouse, a scanner unit 117, a network interface 118, all of which are connected to a bus 119. The image processing device 110 is connected to an external network from the network interface 118 via a communication line 100.

In this embodiment, color bitmap image data that is to be processed is stored in the removable disk unit 114. The image processing program of this embodiment is stored in the HDD 113. When a user activates the image processing program, the image processing program is read into the RAM 1122, so that image processing can be started. Alternatively, image data that is sent to the network interface 118 via the communication line 100, or image data that is read through the scanner unit 117 may be stored in the RAM 112, so that image data can be performed.

Figure 2:
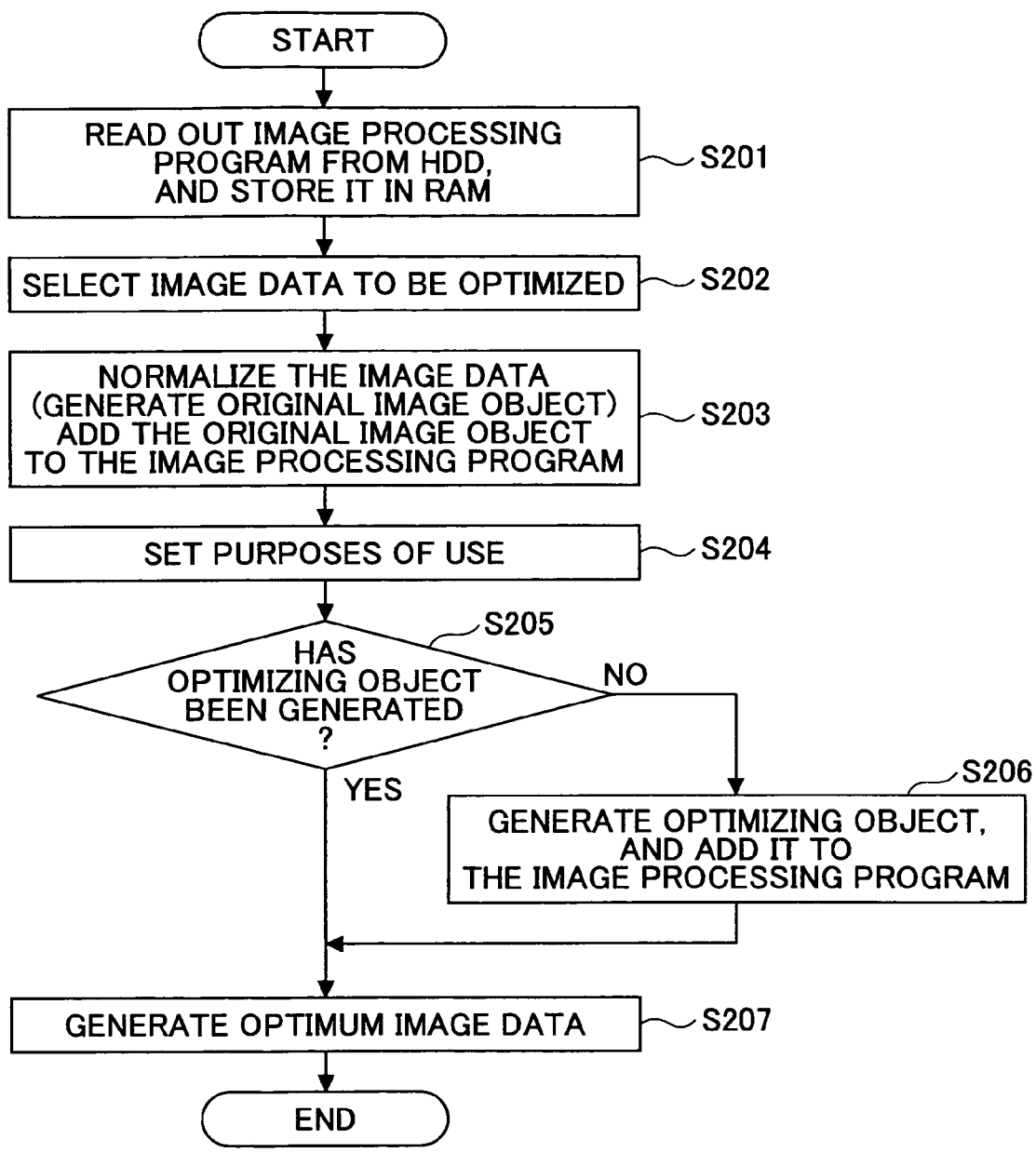
FIG. 2 is a flowchart of the optimum image data generating operation of the image processing device.

Referring now to FIG. 2, an optimum image data generating operation to be performed by the image processing device 110 shown in FIG. 1 is described. FIG. 2 is a flowchart of the optimum image data generating operation to be performed by the image processing device 110.

When the image processing device 110 is first activated, the image processing program stored in the HDD 113 is read into the RAM 1122 in accordance with an instruction from the CPU 111 (step S201). Using the keyboard or the pointing device of the input unit 116, the color bitmap image data to be optimized in accordance with the necessity is selected (step S202), and the image data is read out.

The read image data is stored in the RAM 1122, and normalization is performed in accordance with the image processing program, thereby generating an original image object. The normalizing process is carried out, regardless of the type or the condition of the input image data. The original image object is added to the image processing program in the RAM 1122 as original image data (normalized image data) that is one of the "materials" for generating optimum image data in the image processing device 110 (step S203).

The purposes of use of the image data (the format of the image data to be used) is set with the keyboard or the pointing device of the input unit 116 (step S204). Whether the optimizing object for generating the image data suitable for the selected purpose of use has been generated is determined (step S205). This determination is carried out by a method (a function) that is set in a predetermined object. By this method, management after optimizing object generation is performed at the same time.

If the optimizing object has already been generated ("YES" in step S205), optimum image data is generated using the optimizing object (step S207). If the optimizing object suitable for the use of the input image data has not been generated yet ("NO" in step S205), the optimizing object is generated in accordance with the image processing program. The generated optimizing object is added to the image processing program in the RAM 1122 (step S206). The optimum image data is then generated using the generated optimizing object (step S207), and the optimum image data generating operation comes to an end.

As described in the descriptions of step S203 and step S206, the generated object is added to the image processing program in the RAM 1122. When the program is finished, the image processing program with the added object is stored in the HDD 113, and the image processing program that is read out in step S201 is overwritten.

(Structure of the Object in the Image Processing Program)

Next, the "object" used for realizing the operation shown in the flowchart of FIG. 2 is described. The object is a black box that carries out a predetermined function suitable for the internal condition of the object, depending on input data (parameters). A user calls for an existing object in accordance with the function to be carried out, and then has the function carried out.

In a case where there is not an object having a function to be carried out, or a complicated function is to be carried out, two or more existing objects are combined to generate a single object. As long as the same fundamental function is maintained, an object can readily generate a derivative object when there is a change to the parameters to be handled or the number of functions increases.

As described in the description of the operation shown in the flowchart of FIG. 2, "normalization" is performed on image data that is digitized through an image input device, so as to correct changes in the image quality due to inherent characteristics of the image input device used to input the image data.

For example, depending on the MTF (Modulation Transfer Function) of the scanner, a moire phenomenon might be caused. To avoid this, the normalizing operation disclosed in Japanese Laid-Open Patent Application No. 2003-281526 should be performed to convert a halftone pattern represented by dots into a continuous tone image.

Through the normalizing operation, input image data is turned into original image data that is suited for image processing. The original image data is represented by an original image object generated during the normalizing operation. The original image object is also formed with a group of objects.

Next, an operation for generating an optimum image for each purpose of use (hereinafter referred to as the "optimizing operation") is performed. Here, the purpose of use may involve printing on paper, display on a display panel or a PDA, or searching. Depending on the purpose of use, the image representing format or the file format of the "optimum image" varies.

As for printing on paper, the image data needs to be represented as a structured file such as a raster image or PDF. As for display, the image data needs to be represented in HTML. As for searching, the image data needs to be represented as a text file that has been subjected to an OCR. As described above, when the "optimizing operation" is incorporated into the program for generating image formats or files, an unnecessary load might be caused, or enhancement and maintenance become difficult.

Figure 3:
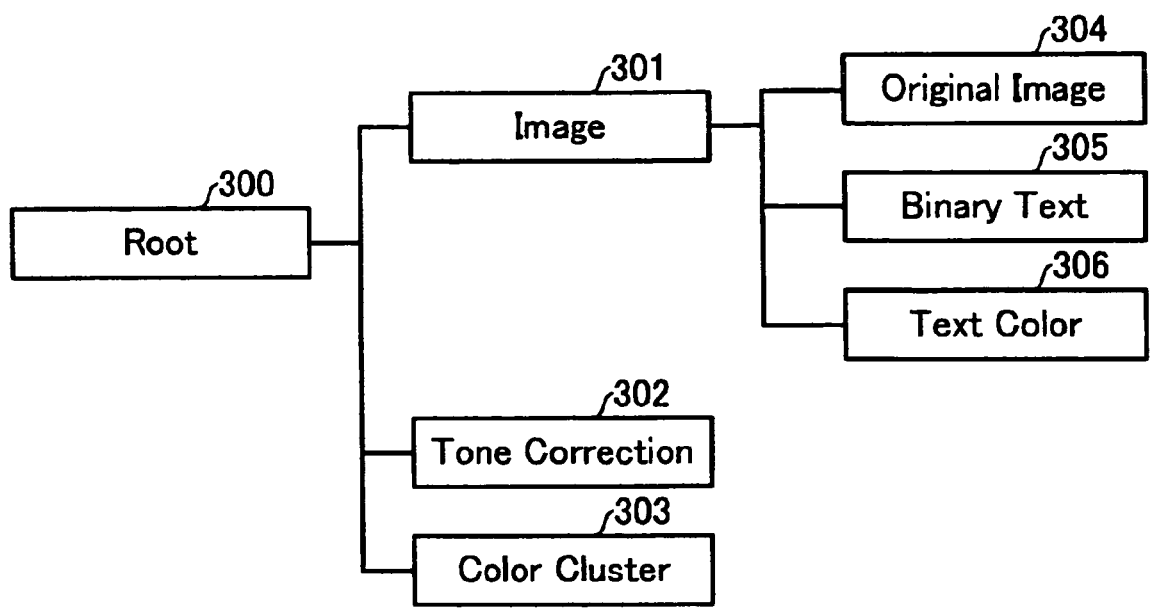
FIG. 3 is a class hierarchy chart showing the entire structure of the "element structure (object) representing" unit.

So as to eliminate those problems, the "materials" for generating original image data and optimum image data, the procedures for generating the optimum image data, and the history and condition of the procedures are regarded as "objects". An "element structure (object) representing" unit is employed to collectively manage those objects. The "element structure (object) representing" unit is formed with classes that constitute a template on which the functions shared by the objects of the same kinds and the memory formats inherent to the respective objects are written. FIG. 3 is a hierarchy chart illustrating the entire structure of the "element structure (object) representing" unit.

In the class hierarchy shown in FIG. 3, Root 300 is a formal root that gathers the entire "element structure (object) representing" unit, and has a hollow inside. Root 300 has three base classes: Image 301, Tone Correction 302, and Color Cluster 303.

Image 301 is a class of general image objects, and stores basic data such as image information (as to sizes and resolutions) and raster image arrays. Image 301 also stores the procedures for setting the stored data as its own method. Tone Correction 302 is a class of tone correcting objects. Color Cluster 303 is a class of character color clustering objects.

Original Image 304 is a class of original image objects that represent image data obtained by normalizing image data that are input from an imaging device or are acquired from a communication circuit or a data reader (i.e., the image data stored in the removable disk unit 114 in this embodiment). Binary Text 305 is a class of character objects, and Text Color 306 is a class of character color objects. Those three classes derive from Image 301.

(Object Structures)

Using the classes deriving from each function shown in FIG. 3, an object is formed for each type of image processing. The objects in the image processing program in accordance with this embodiment of the present invention include original image objects and optimizing objects. The original image objects represent original images on which normalization has been performed. The optimizing objects represent the set of parameters and data for defining the optimizing processing to be performed on original images or the set of parameters and data for defining the processing to be performed on image elements required for optimizing operations.

FIG. 4 shows an example structure of an optimizing object. The optimizing object 400 includes an original image object 401, a tone correcting object 402, a character object 403, a character color object 404, and a character color clustering object 405 that derives from the character color object 404. While the original image object 401 has already been described above, the other objects are described in the following.

The tone correcting object: the object that stores and holds the parameters for defining the tone correction for "background elimination" to reduce the background portion of image data to white or "background cleaning" to reduce the background portion to a representative color.

The character object: the object that extracts characters from image data, and stores and holds the characters as binary image data of the original resolution or a higher resolution.

The character color object: the object that extracts characters from image data, and stores and holds the color data of each of the characters.

The character color clustering object; the object that classifies the character color data stored by the character color object into a small number of clusters, and allocates each character in image data to one of the color clusters.

The pointer (the variable or argument indicating the memory region in accordance with the program) from the object that is the "input" to generate the subject object is provided to each of the objects that constitute the above optimizing object. Since the tone correcting object 402, the character object 403, the character color object 404 are generated with the original image data (normalized input image data) being the inputs, the pointer from the original image object 401 is provided. Since the character color clustering object 405 is calculated with the character color object 404 being the input, the pointer from the character color object 404 is provided.

(Member Variables and Method of Each Object)

Each object holds the following member variables (representing the current state of the class) and methods as follows.

Basic data: the basic data of an object (an image or parameters).

Procedures for generating the optimizing object: to calculate the set of parameters and data for defining the optimizing operation; and to generate the corresponding optimizing object, and to manage the calculation result as the optimizing object.

The pointer for the optimizing object: the pointer to be provided for the optimizing object generated based on the object.

The management and setting of the current condition: the procedures for setting the history and condition such as the ON/OFF state of the optimizing operation, and the variables for managing the history and condition.

The procedures for rendering images according to the current condition: the current condition of the optimizing operation is referred to, so as to render image data.

Which member variables and method should be used, or the contents of the used member variables and method vary among the objects. For example, the original image object 401 includes the following member variables and methods 1) through 5).

1) Basic data
   The raster data, size, and resolution of the original image
2) Procedures for generating the optimizing object
   Generation of the tone correcting object
   Generation of the character object (with the resolution magnification being the parameter) and the character color object
3) Pointer for the optimizing object
   Tone correcting object
   Character object (for each resolution magnification)
   Character color object
4) Procedures for setting the current condition, and variables for managing the condition
   Tone correcting mode (background elimination, background cleaning, or OFF)
   Tone correcting index to be used for background elimination or cleaning
   Character resolution magnification (1 or greater in the case of emphasizing the character, 0 in the case of not emphasizing the character)
5) Procedures for rendering images in accordance with the current condition
   Generation of raster image data: the procedures for generating raster image data on which operations such as tone correction and resolution correction have been performed, with referent to the current condition (for printing)
   Binary/color character image data output: the procedures for outputting the character image data of a designated region, with reference to the current state, especially the character resolution magnification (for OCR and HTML)
   Generation of the character image data that belongs to each color cluster: the procedures for generating binary image data that collectively represent the characters in the color that belongs to each of the color clusters (for PDF)

The character color object 404 includes the following member variables and methods 1) through 4).

1) Basic data
   The raster image data, size, and resolution of the color of each character
2) Procedures for generating the optimizing object
   Generation of the character color clustering object
3) Pointer for the optimizing object
   Character color clustering object
4) Procedures for setting the current condition, and variables for managing the condition
   ON/OFF of the clustering operation (Generation of Optimizing Object, and Setting/Changes and Management of Conditions)

It is troublesome to manage whether the optimizing object has been generated for each purpose of use on the application side. Therefore, the generation of the optimizing object and the setting and changes of the conditions are made possible by the same method.

For example, the generation of the tone correcting object, the mode setting and changes (background elimination, background cleaning, or tone correction OFF), and the setting and changes of the intensities of background elimination/cleaning are performed by a single method of the original image object "set_tone_correction (int mode, int factor)". In a case where the tone correcting object has not been generated at the time of activating the method, the generation of the tone correcting object is performed (including the calculation of the representative color of the background an the calculation of the parameters for defining tone correction), and the setting of the conditions (the tone correcting mode and index) is then performed. In a case where the tone correcting object has already been generated, only the setting and changes of the conditions are performed.

PROGRAM EXAMPLES

Examples of optimum image generating programs using the object-oriented representing program of the above described image elements are shown in the program language "C++".

FIG. 5 shows an example of the program for defining the class of original image objects. FIG. 6 shows an example of the program for defining the class of character color objects. Source codes 500 in FIG. 5 and Source codes 600 in FIG. 6 are examples of programming in the program language "C++".

FIGS. 7A through 7C show an example of the program for defining an object relating to original image generation, and the results of image generation. Source codes 710 in FIG. 7A declares a variable "img" to be the pointer for the original image class, and a variable "dibarray" to be the pointer for the character array to store rendered images. The method "set_image" for initializing the original image object "img" is activated with the pointer "dibarray_0" for input image data being the parameter. Here, as the method "rendering" for generating raster image data by referring to the current state of the object "img" is activated, an image 720 as shown in FIG. 7B is generated. Since the "optimizing operation" has not been performed, the input image is output as it is. FIG. 7C shows an enlarged image 730 of part of such an input image.

FIGS. 8A through 8C show an example of the program relating to the image background cleaning, and the results of image generation. In source codes 810 shown in FIG. 8A, the method "set_tone_corection" for setting a tone correcting object is activated so as to set the background cleaning of level 0. Further, the method "set_text_enhancement" for setting a character object (doubling the resolution) and a character color object is activated. Here, as the method "rendering" for generating raster data by referring to the current state of the object "img" is activated, an image 820 as shown in FIG. 8B is generated. FIG. 8C shows an enlarged image 830 of a part of such an image. As can be seen from FIG. 8C, stains and see-through images in the background are eliminated, and the clarity of each character is increased in the enlarged image.

FIG. 9A through 9C show an example of the program relating to the image background cleaning, and the results of image generation. In source codes 910 in FIG. 9A, the method ""set_tone_correction" is activated so as that the tone correcting object does not function. Here, as the method "rendering" for generating raster image data by referring to the current state of the object "img" is activated, an image 920 as shown in FIG. 9B is generated. FIG. 9C shows an enlarged image 930 of a part of the image 920. Although stains and see-through images are reproduced in the background by returning to the state of the original image, the clarity of each enlarged character remains the same as that in the enlarged image 830 of FIG. 8C.

FIGS. 10A through 10C show an example of the program relating to the character emphasis in an image and background cleaning, and the results of image generation. In source codes 1010 shown in FIG. 10A, the method "set_text_enhancement" is activated so that a character object and a character color object do not function. Also, the method "set_tone_correction" for setting a tone correcting object is activated so as to set the background elimination of level 0. As the method "rendering" for generating raster image data by referring to the current state of the object "img" is activated, an image 1020 as shown in FIG. 10B is generated. FIG. 10C shows an enlarged image 1030 of a part of the image 1020. Although the background is eliminated and reduced to white, the characters return to the state of the original image.

FIGS. 11A through 11C show an example of the program relating to the character resolution and character color in an image, and the result of the image generation. In source codes 1110 shown in FIG. 11A, the method "set_text_enhancement" for setting a character object (doubling the resolution) and a character color object is activated. Further, the method "set_color_clustering" of the character color object "Text_Color" is activated so as to turn the character color clustering on. By activating the method "number_of_cluster" of the object "Text_Color", the number of color clusters (two in this example) can be obtained. When the method "get_color_plane" for generating image data gathering the characters that belong to each color cluster is activated, an image 1120 and an image 1130 for each character color cluster are obtained as shown in FIGS. 11B and 11C.

Figures 12A, 12B:
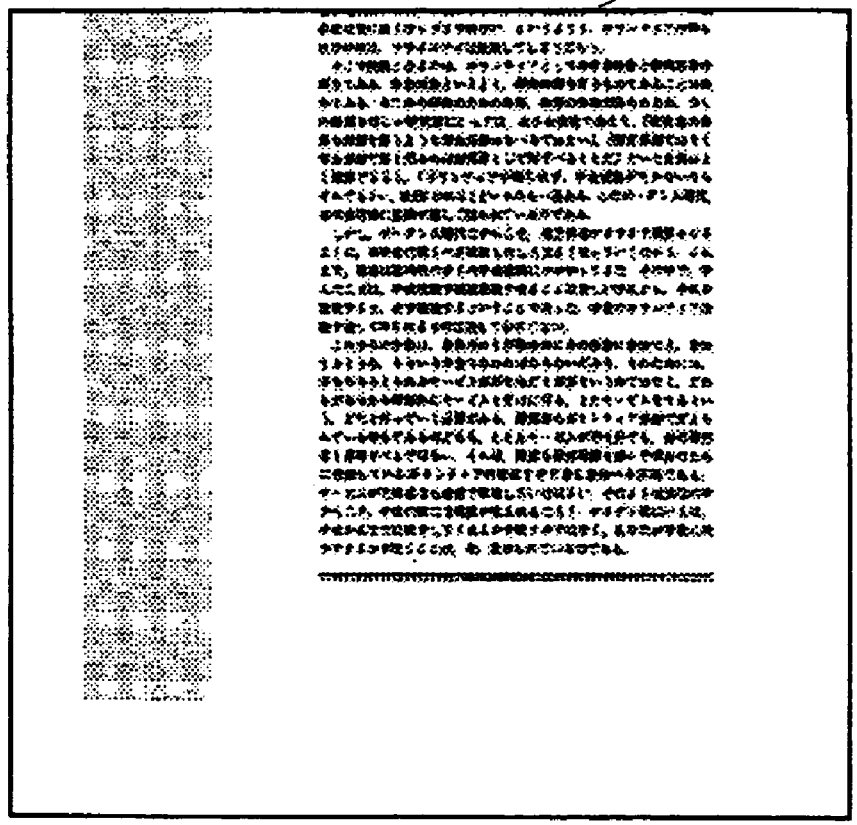
FIG. 12A shows an example of the program relating to raster image generation.
FIG. 12B shows a result of image generation in accordance with the source codes shown in FIG. 12A.

FIGS. 12A and 12B show an example of the program relating to raster image generation, and the results of the image generation. In source codes 1210 shown in FIG. 12A, the method "rendering" for generating raster image data by referring to the current state of the object "img" is activated. Compared with the image 920 shown in FIG. 9B, a generated image 1220 shown in FIG. 12B has the character resolution twice as high. Accordingly, the clarity is also higher. Further, as the character colors are clustered, unevenness is eliminated from each color. Meanwhile, the background remains eliminated.

Figures 13A, 13B:
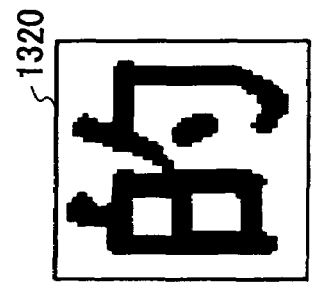
FIG. 13A shows an example of the program relating to the tone correction and characters in an image.
FIG. 13B shows a result of image generation in accordance with the source codes shown in FIG. 13A.
Figures 13C, 13D:
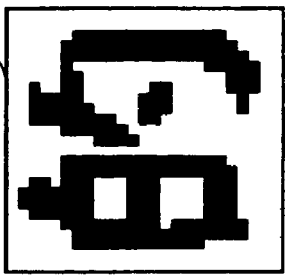
FIG. 13C shows an example of the program relating to the tone correction and characters in an image.
FIG. 13D shows an result of image generation in accordance with the source codes shown in FIG. 13A.

FIGS. 13A through 13D show an example of the program relating to the tone correction and characters in an image, and the results of image generation. In source codes 1310 shown in FIG. 13A, the method "get_binary_character" is activated for generating binary character image data that belongs to a partial region of 25 in width and height, with the point of origin being the pixel located at the coordinates (807, 828) in the original image. Here, the character resolution is set twice as high. An image 1320 shown in FIG. 13B is generated from the source codes 1310. In source codes 1330 shown in FIG. 13C, the character resolution is returned to the original value by the method "set_text_enhancement", and the method "get_binary_character" is again activated. An image 1340 shown in FIG. 13D is generated from the source codes 1330. As can be seen from the generated images, the difference in binary image quality due to the difference in character resolution is significant.

FIGS. 14A through 14C show an example of the program relating to the tone correction, characters, and character colors in an image, and the results of the image generation. In source codes 1410 shown in FIG. 14A, two methods are activated, so that a tone correcting object does not function, and a character object and a character color object do not function. FIG. 14B shows an image 1420 that is generated by activating the method "rendering". FIG. 14C shows an enlarged image 1430 of a part of the image 1420. As can be seen from the images 1420 and 1430, the state of the image returns to the same state as that of the enlarged original image 730.

Figures 15A, 15B:
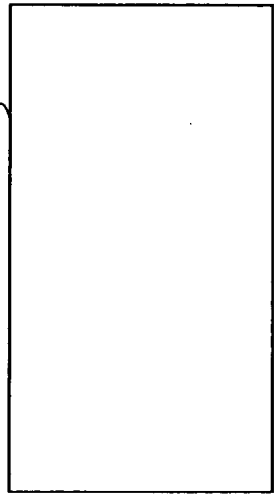
FIG. 15A shows an example of the program relating to a binary character image.
FIG. 15B shows a result of image generation in accordance with the source codes shown in FIG. 15A.

FIGS. 15A and 15B show an example of the program relating to a binary character image, and the results of the image generation. In source codes 1510 shown in FIG. 15A, the method "get_binary_character" for extracting the binary character image data that belongs to the partial region is activated as in the source codes 1310 shown in FIG. 13A. However, as the character object and the character color object do not function, the characters cannot be extracted. As a result, an image is not generated as shown in FIG. 15B.

Figures 16A, 16B:
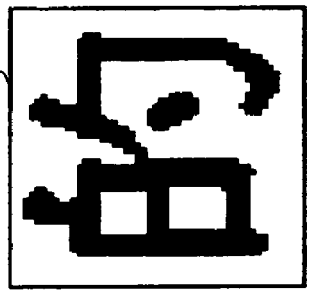
FIG. 16A shows an example of the program relating to the resolution of a binary character image.
FIG. 16B shows a result of image generation in accordance with the source codes shown in FIG. 16A.

FIGS. 16A and 16B show an example of the program relating to the resolution of a binary character image, and the results of the image generation. In source codes 1610 shown in FIG. 16A, the method "set_text_enhancement" is activated so as to set a character object and a character color object with a resolution twice as high. When the method "get_binary_character" for extracting the binary character image data that belongs to the partial region is activated, an image 1620 that is the same as the image 1320 (see FIG. 13B) generated as a result of the source codes 1310 shown in FIG. 13A is obtained as shown in FIG. 16B.

As described above, only the existent methods are used in the examples of programs in the embodiments of the present invention. In this manner, an image suitable for the purpose of use can be obtained by a small number of methods, regardless of the type of each "optimizing operation". Also, it is not necessary to store and hold intermediate data. Even if a new "optimizing operation" is introduced, the formats are made uniform so that methods (member functions) implementing different functionalities can be handled equally through a common interface (polymorphism). By doing so, even if a new object is to be produced, only the part for calling up the operating method for the object corresponding to the operation needs to be added.

So as to cope with the purpose of use of digitized various image data, this embodiment provides a method of collectively managing the "materials" for generating original image data and optimum image data, the procedures for generating optimum image data, and the history and conditions of the operation as "objects". By introducing the "object orientation", the following advantages 1) through 3) are achieved.

1) As the history and conditions of operations are collectively managed, it is not necessary to take each purpose of use into consideration.
2) Since the original image data (normalized) and the "materials" for optimization are constantly stored and held,
   it is possible to return to any desired state, and it is easy to perform "Undo" and "Redo", and
   the "materials" for generating once produced optimum image data can be shared, so that the optimizing operation is not called from two or more "purposes of use".
3) Since the purposes of use and the optimum image generation are managed separately, the extensibility and the system maintenance can be made easier. On the side of the system, the current "state" is referred to, and the procedures for producing the image corresponding to each purpose of use should be prepared as the method associated with the object. For example, only a simple procedure for generating a raster image to be used for printing or binary image data to be used for OCR from the "materials" for generating original image data and optimum image data should be prepared.

As described above, with an image processing device, an image processing method, an image processing program, and a recording medium in accordance with the present invention, the data for generating the optimum image for each purpose of use of color document images input through a scanner and an imaging device is handled based on the "object orientation. Thus, a smaller load and less waste are caused, and image processing with excellent extensibility can be performed while only simple maintenance is required.

The image processing method described in the above embodiment can be realized by executing a predetermined image processing program in a computer such as a personal computer and a workstation. This program is recorded on a recording medium such as a hark disk, a flexible disk, a CD-ROM, a MO, or a DVD, which can be read with a computer. The program is then read out from the recording medium, and is executed by a computer. The program may be a transmission medium that can be distributed over a network such as the Internet.

As described so far, an image processing device, an image processing method, an image processing program, and a recording medium in accordance with the present invention are useful in a case where image data containing characters read in through a scanner or a digital camera is to be converted into the optimum data state for the purpose of use. Especially the present invention is suitable in a case where a publication on a paper medium is to be converted into digital information such as PDF to be published over a network.

It should be noted that the present invention is not limited to the embodiments specifically disclosed above, but other variations and modifications may be made without departing from the scope of the present invention.

This patent application is based on Japanese Priority Patent Application No. 2004-233802, filed on Aug. 10, 2004, the entire contents of which are hereby incorporated by reference.

What is claimed is:

1. An image processing device that performs object-oriented image processing, using an original image object that is generated by normalizing input image data into a state suitable for the image processing, and an optimizing object derived from the original image object, wherein the original image object includes member variables and methods which include procedures for generating the optimizing object, procedures for setting the current condition, and variables for managing the condition, the image processing device comprising:

an optimizing object generating unit configured to generate the optimizing object based on the original image object according to a format specified by a user, by executing the procedures for generating the optimizing object included in the original image object, the optimizing object being defined by the image processing to be performed on the original image object and image elements;

a storing unit;

a control unit configured to store the original image object, the generated optimizing object, and a pointer to the generated optimizing object as one of the member variables in the original image object; and an optimizing unit configured to generate optimum image data using the original image object and the generated optimizing object stored in the storing unit.

2. An image processing method that performs object-oriented image processing with a computer processor, using an original image object that is generated by normalizing input image data obtained from an image input device into a state suitable for the image processing, and an optimizing object derived from the original image object, wherein the original image object includes member variables and methods which include procedures for generating the optimizing object, procedures for setting the current condition, and variables for managing the condition, the image processing method comprising the steps of:

generating the optimizing object based on the original image object according to a format specified by a user, by executing the procedures for generating the optimizing object included in the original image object, the optimizing object being defined by the image processing to be performed on the original image object and image elements;

storing the original image object, the generated optimizing object, and a pointer to the generated optimizing object as one of the member variables in the original image object; and generating optimum image data using the original image object and the generated optimizing object.

3. The image processing method as claimed in claim 2, wherein one of the procedures for generating the optimizing object is a procedure for generating the optimizing object as an object that represents the tone correction curve to be used in a background eliminating process for collectively changing the background portion of the normalized image data into white.

4. The image processing method as claimed in claim 2, wherein one of the procedures for generating the optimizing object is a procedure for generating the optimizing object as an object that represents the tone correction curve to be used in a background cleaning process for collectively changing the background portion of the normalized image data into a representative color.

5. The image processing method as claimed in claim 2, wherein one of the procedures for generating the optimizing object is a procedure for generating the optimizing object as an object that represents the binary image data extracted in an extracting process for extracting characters from the normalized image data, the characters being extracted as binary image data of the original resolution or a higher resolution.

6. The image processing method as claimed in claim 2, wherein one of the procedures for generating the optimizing object is a procedure for generating the optimizing object as an object that represents character color data estimated in an estimating process for estimating a color for each character extracted from the normalized image data.

7. The image processing method as claimed in claim 6, wherein one of the procedures for generating the optimizing object is a procedure for classifying the character color data into a small number of clusters, and allocating each character in the normalized image data to one of the color clusters; and generating an object that represents cluster characterizing data and the cluster allocating data as to each character, the object being generated as one of objects that form the optimizing object.

8. A computer readable storage medium on which a program for causing a computer to execute an image processing method that performs object-oriented image processing using an original image object that is generated by normalizing input image data into a state suitable for the image processing, and an optimizing object derived from the original image object, wherein the original image object includes member variables and methods which include procedures for generating the optimizing object, procedures for setting the current condition, and variables for managing the condition is recorded, the image processing method comprising the steps of:

generating the optimizing object based on the original image object according to a format specified by a user, by executing the procedures for generating the optimizing object included in the original image object, the optimizing object being defined by the image processing to be performed on the original image object and image elements;

storing the original image object, the generated optimizing object, and a pointer to the generated optimizing object as one of the member variables in the original image object; and generating optimum image data using the original image object and the generated optimizing object.

* * * * *